Patented Dec. 19, 1944

2,365,340

UNITED STATES PATENT OFFICE 2,365,340

SOLVOLYSIS OF POLYMERIC N-VINYL-IMIDES AND PRODUCTS THEREFROM

William E. Hanford and Halsey B. Stevenson, Wilmington, Del., assignors to E. I. du Pont de Nemours & Company, Wilmington, Del., a corporation of Delaware No Drawing. Application February 5, 1942,
Serial No. 429,686

7 Claims. (Cl. 260—85)

This invention relates to new synthetic resins and more particularly to the resins formed by the hydrolysis of polyvinyl imides.

This invention has as an object the preparation of materials useful as tanning agents or for modifying the dyeing characteristics of natural or synthetic fibers. Other objects will appear hereinafter.

These objects are accomplished by the following invention wherein a polymer of an N-vinyl-imide of an organic dicarboxylic acid, i. e., a compound wherein the two hydroxyls of the carboxyl groups of the acid are replaced by the divalent radical =N—CH=CH$_2$, is solvolyzed, i. e., cleaved by the action of a solvent, to give a compound having at least one of the bonds between the acyl carbon and the imido nitrogen opened up by reacting the polyvinyl imide with an active hydrogen containing polar solvent of the class consisting of water, ammonia and basic amines having hydrogen on amino nitrogen.

The manner in which this phase of the invention is carried out can be varied widely depending on the type of solvolysis product desired. The term solvolysis is used in a very general sense which includes any cleavage of the imide group by reagents such as alkalies, acids, amines, ammonia and water. In general, the polyvinyl imide is placed in a vessel with a cleavage agent such as hydrochloric acid, ammonia, or ethanolamine, and heated. In many cases the temperature used is such that the reaction is necessarily carried out in a closed system under pressure. By choice of various solvolytic agents and reaction cycles as described later in this specification, polymers containing amino groups, or carboxyl groups or both can be produced. After the reaction has proceeded to the proper stage depending upon the solvolysis product desired, the solvolyzed polymer is separated from the solvolytic agent and the materials which have been cleaved from the polymer. This is generally accomplished by precipitation from various appropriate solvents. For example, the polymers can be separated from organic materials such as phenol by precipitation in acetone. When the solvolyzed polymer is insoluble in water and the solvolysis has proceeded to give a polyamine or a polycarboxylic acid, it can be dissolved in dilute acids or bases and then purified by reprecipitation.

The more detailed practice of the invention is illustrated by the following examples, wherein parts given are by weight. There are of course many forms of the invention other than these specific embodiments.

EXAMPLE I

*Hydrolysis of polyvinylphthalimide with concentrated hydrobromic acid*

Five parts of polyvinylphthalimide is dissolved on heating in 15 parts of phenol. To this is added 69 parts of hydrobromic acid (sp. g., 1.38) and the mixture is refluxed (about 115–125° C.) for 100 hours. After about 30 hours the upper layer becomes dark and much less viscous. At the end of 100 hours an insoluble solid is formed. The upper layer is poured off and upon the addition of acetone, a solid precipitates which is removed by filtration and washed with acetone. This hydrobromide of the hydrolyzed polyvinyl imide is dissolved in water, and the hydrolyzed polyvinyl imide is precipitated by the addition of an appropriate amount of sodium hydroxide solution. This material dissolves in either acids or bases indicating that this hydrolysis produces both amino groups and carboxyl groups.

EXAMPLE II

*Hydrolysis of polyvinylsuccinimide with concentrated hydrochloric acid*

Two hundred and ten parts of polyvinylsuccinimide dissolved in 1922 parts of concentrated hydrochloric acid is heated in a glass-lined container under 700 lbs. pressure for 6 hrs. at 180° C. The resultant mass of crystals suspended in a brown-colored solution is separated by filtration. The crystalline material is dried and the succinic acid is extracted with acetone to give a 62% recovery of pure succinic acid. The residue which is insoluble in acetone is added to the brown-colored solution and the mixture is evaporated to dryness to remove most of the hydrochloric acid. The dark brown residue is dissolved in the least quantity of water, treated with an excess of caustic and purified by dialysis through Cellophane. After 7 days the liquid is evaporated to dryness to give 40 parts of a dark-brown solid showing on analysis by the Kjeldahl method, 16.95% of nitrogen and by the Van Slyke method, 12.65% of nitrogen. These analyses indicate that the hydrolyzed product is composed of approximately 75% free amino groups and 25% incompletely hydrolyzed imide groups.

EXAMPLE III

*Hydrolysis of polyvinylsuccinimide by means of sodium hydroxide*

Fifty parts of polyvinylsuccinimide is treated with a solution of 19 parts of sodium hydroxide (20% excess) in 200 parts of water. The polymer dissolves rapidly on heating and the solution is refluxed (at about 105° C.) for 2 hours, after which titration of a sample with hydrochloric acid indicates that the ring opening is complete. A slight excess of hydrochloric acid is added and the mixture is cooled to precipitate the free polymer. This is purified further by twice dissolving in warm water and precipitating by cooling. It is then macerated under acetone and dried to give 54 parts of a white infusible solid. This material is a polymer composed substantially of units having the constitution

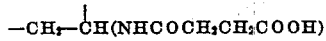

Example IV

Treatment of polyvinylsuccinimide with ethanolamine

A mixture of 50 parts of polyvinylsuccinimide and 228 parts of ethanolamine is refluxed (at about 172° C.) with stirring under an atmosphere of nitrogen for 12 hours. The mixture becomes quite viscous as the polymer goes into solution but more fluid as the reaction progresses. After cooling the solution is poured with stirring into cold acetone. The resultant tacky precipitate is extracted with acetone in a continuous extractor. This produces 24 parts of a brown basic polymer which is very soluble in water and which shows on analysis by the Kjeldahl method, 16.88% of nitrogen and by the Van Slyke method 7.07% of nitrogen. This indicates that the product contains approximately 40% of the nitrogen in the form of primary amine groups and that the remainder of the polymer consists of units having the formula

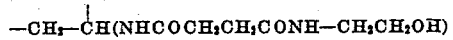

The acetone extract gives a 60% yield of the diethylolamide of succinic acid.

Example V

Hydrolysis of polyvinylphthalimide by means of sodium hydroxide in phenol

A mixture of 65 parts of polyvinylphthalimide, 40 parts of sodium hydroxide, 250 parts of phenol and 100 parts of water is stirred until solution is complete, and is then refluxed (at about 105–110° C.) for 100 hours. The brown-colored solution is poured into acetone, the precipitated hydrolysis product is then dissolved in water, reprecipitated with hydrochloric acid, and dried. This produces 70 parts of a light-brown solid which is soluble only in alkalies, indicating that this polymer is composed largely of units having the constitution of

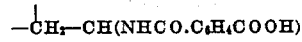

Example VI

Reaction of polyvinylphthalimide with ethanolamine

A mixture of 45 parts of granular polyvinylphthalimide is heated with 150 parts of ethanolamine with vigorous stirring. The mixture gels at a bath temperature of 170° C. but after 20 minutes at a bath temperature of 190° C. goes into solution. After another 20 minutes a gelatinous precipitate begins to form. Stirring is continued for 3 hours, the mixture is cooled, and the ethanolamine is removed by decantation. This produces 30 parts of a brown, hard, acid-soluble, water-sensitive material. The acid solubility of this polymer indicates the presence of amino groups.

Example VII

Hydrolysis of polyvinylphthalimide by ammonia in phenol

A mixture of 32 parts of polyvinylphthalimide, 60 parts of phenol and 40 parts of liquid ammonia is heated at 150° C. for 6 hours under pressure. The dark, precipitated material is separated and dissolved in 10% sulfuric acid. The light-brown solution is filtered and neutralized with ammonia to give 15 parts of an amphoteric material. The amphoteric character of this material indicates that the cleavage has produced both amino and carboxyl groups.

Example VIII

Hydrolysis of vinylsuccinimide copolymer by hydrochloric acid in acetic acid A mixture comprising 8 parts of an N-vinyl-succinimide/ethylene copolymer containing approximately 1 N-vinylsuccinimide unit to 3.3 ethylene units, 420 parts of glacial acetic acid, 58 parts of concentrated hydrochloric acid, and 50 parts of water is heated in a glass-lined vessel at 180° C. for 6 hours. The reaction mixture is filtered and the filtrate evaporated in vacuo. The residue is dissolved in water, an excess of sodium hydroxide added and the solution is dialyzed through Cellophane until the inorganic matter has been removed. The resultant solution on evaporation to dryness, gives a basic resin.

The process of this invention, i. e., solvolytic cleavage, is applicable to any N-vinyl imide of an organic dicarboxylic acid, i. e., any acid having the hydroxyls of the two carboxyls replaced by the vinyl imide, $CH_2=CH-N=$, radical, including the N-vinyl imides of aliphatic, aromatic, and heterocyclic dicarboxylic acids, e. g., the polymeric N-vinyl imides derived from N-vinyl-tetrahydrophthalimide, N-vinyl-alpha-methyl-glutarimide, N-vinyl-beta-methylglutarimide, N-vinylphenylsuccinimide, N-vinylbutylsuccinimide, N-vinylmethylsuccinimide, and N-vinylthiodiglycolimide, $S(CH_2CO)_2NCH=CH_2$. The N-vinyl imides of phthalic, 3-nitrophthalic, 4-bromophthalic, tetrachlorophthalic, 2,3-naphthalenedicarboxylic, 3,6-dihydroxyphthalic naphthalic, and quinolinic acid are suitable. In addition to polymers derived from any one of the N-vinyl imides mentioned above, interpolymers derived from various combinations of these are operable. The interpolymers of N-vinyl imides with other polymerizable compounds such as ethylene, vinyl acetate, styrene, methyl vinyl ketone, methyl methacrylate, methyl acrylate, methacrylonitrile and chloroprene can also be solvolyzed.

The preparation of the polymeric N-vinyl imides is described in our U. S. Patent 2,231,905 and in our copending application Serial No. 285,194, filed July 18, 1939, issued March 17, 1942, as U. S. Patent No. 2,276,840.

The examples illustrate the hydrolysis of polymeric N-vinyl imides by both acids and bases. In general, when acid hydrolysis is being carried out, strong mineral acids such as hydrochloric, sulfuric, sulfamic, and phosphoric are preferred, but organic acids such as trichloroacetic and formic acid may be used. The bases which may be employed include aqueous solutions of alkali and alkaline earth metallic hydroxides, such as sodium hydroxide, potassium hydroxide, calcium hydroxide, and barium hydroxide and quaternary ammonium hydroxides, e. g., tetramethylammonium hydroxide. The term "solvolysis" includes the cleavage reaction taking place with substantially anhydrous amino hydrogen containing bases such as liquid ammonia and ethanolamine, which reaction is quite analogous to the hydrolysis accomplished by aqueous acids and bases. The anhydrous amino hydrogen containing bases include ammonia, basic amino hydrogen containing amines, e. g., methylamine, diethylamine, and aniline, and hydroxyamines such as ethanolamine and beta-hydroxypropylamine.

A wide variety of polymeric materials can be used in this invention and a correspondingly large variety of products can be obtained. For example, the vigorous hydrolysis of polyvinylsuccinimide with hydrochloric acid in Example II produces a polymer which is composed largely of primary amine groups with some incompletely hydrolyzed polyvinyl imide groups and contains the group

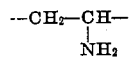

as a recurring structural unit. On the other hand, as illustrated in Example III, hydrolysis by means of sodium hydroxide produces an acidic polymer which is composed of a large proportion of units of an amidic acid, e. g.,

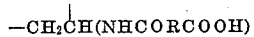

where R is a bivalent radical, aliphatic or aromatic and usually hydrocarbon. In the cleavage of polyvinylsuccinimide by means of ethanolamine as illustrated in Example IV, some of the polymer is hydrolyzed to the primary amine, some of the corresponding amide of the polycarbamic acid, having

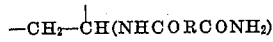

as the structural unit, is produced, and it is probable that some of the imide groups are left unattacked. Thus, what has been illustrated for polyvinylsuccinimide and polyvinylphthalimide holds true for other polyvinyl imides, with the provision that the hydrolytic agent and degree of hydrolysis must be varied depending upon the polymeric vinyl imide used and upon the extent and type of hydrolysis desired.

The solvolysis or hydrolysis is continued until at least 25% of the total carbonamido groups are hydrolyzed. This end point may be determined by an appropriate analytical method, the choice of the method to be used depending upon the hydrolytic agent. Thus, in Examples II and IV (acid hydrolysis and amine hydrolysis) the product was analyzed for total nitrogen and Van Slyke nitrogen. The product obtained by alkaline hydrolysis (Example III) contains free carboxyl groups which can be titrated with dilute alkali.

While it is possible under very mild conditions to obtain products having less than 25% of the total carbonamido groups hydrolyzed, such products are less suitable for the uses recited, since their physical properties, in particular their solubility, are not very different from those of the original polymeric N-vinyl imides.

The temperature of solvolysis may range from room temperature up to the decomposition point of the polymer (in the neighborhood of 250° C.), although at the lower temperature, the solvolysis is slow. The temperature range is ordinarily 100–200° C.

Solvolysis to give basic polymers, i. e., those containing free amino groups, is best done in aqueous systems using strong non-oxidizing mineral acids as catalysts, higher temperatures and longer times of hydrolysis. Imides of aliphatic acids solvolyze more readily than do imides of heterocyclic or aromatic dicarboxylic acids. The use of more drastic conditions, i. e., complete or substantially complete hydrolysis, favors the production of amino groups. The use of acids favors the production of amino groups, the use of bases the production of carboxyl groups. The use of amines including alkylolamines favors first the production of amides, i. e., ring opened compounds, then of amines.

The products of this invention are polymeric amides containing in polymeric combination an N-vinyl-amide of an organic dicarboxylic acid. In addition they may have free amino and/or carboxyl groups. They may also be termed polymeric solvolytic products of N-vinyl imides of organic dicarboxylic acids, said solvolytic products having a vinyl group in polymeric combination, i. e., a polymerized vinyl group attached to tervalent nitrogen, one valence of which is attached to hydrogen, the remaining one being attached either to hydrogen or the monovalent acyl radical of the organic dicarboxylic acid. When the third valence is attached to hydrogen, the polymer has free amino groups.

These polymeric materials are particularly useful for modifying the characteristics, such as dyeing susceptibility, of natural and synthetic fibers. Other outlets for these materials include such applications as corrosion inhibitors, tanning agents, photographic chemicals, surface-active agents, protein hardeners and as ingredients in pigment compositions. These products are also useful in improving the adhesion of lacquers to cellulosic materials.

The above description and examples are intended to be illustrative only. Any modification of or variation therefrom which conforms to the spirit of the invention is intended to be included within the scope of the claims.

What is claimed is:

1. A process for cleaving a polymer of an N-vinyl imide of an organic dicarboxylic acid which comprises maintaining the same in contact at 100–200° C. with an active hydrogen containing hydrolytic agent of the class consisting of aqueous solutions of basic metal hydroxides, aqueous solutions of quaternary ammonium hydroxides, aqueous solutions of strong mineral acids, aqueous solutions of trichloroacetic acid and aqueous solutions of formic acid.

2. A process for cleaving a polymer of an N-vinyl imide of an organic dicarboxylic acid which comprises reacting them at 100–200° C. with an aqueous solution of a basic metal hydroxide.

3. A process for cleaving a polymer of an N-vinyl imide of an organic dicarboxylic acid which comprises reacting them at 100–200° C. with an aqueous solution of a strong mineral acid.

4. A polymeric hydrolysis product of an N-vinyl imide of an organic dicarboxylic acid said polymeric hydrolysis product having recurring acylamidoethylene units wherein the acyl group is that of said organic dicarboxylic acid and the amido nitrogen carries a hydrogen.

5. A polymeric solvolytic product of an N-vinyl imide of an organic dicarboxylic acid, said polymeric solvolytic product having recurring free amino groups and recurring acylamidoethylene units wherein the acyl group is that of said organic dicarboxylic acid.

6. A polymeric solvolytic product of an N-vinyl imide of an organic dicarboxylic acid, said polymeric solvolytic product having recurring free carboxyl groups and recurring acylamidoethylene units wherein the acyl group is that of said organic dicarboxylic acid.

7. A polymeric solvolytic product of an N-vinyl imide of an organic dicarboxylic acid, said polymeric solvolytic product having recurring free amino groups, recurring free carboxyl groups and recurring acylamidoethylene units wherein the acyl group is that of said organic dicarboxylic acid.

WILLIAM E. HANFORD.
HALSEY B. STEVENSON.